United States Patent
Haase et al.

(10) Patent No.: US 11,297,063 B2
(45) Date of Patent: Apr. 5, 2022

(54) METHOD FOR USER ADMINISTRATION OF A FIELD DEVICE

(71) Applicant: Endress+Hauser Conducta GmbH+Co. KG, Gerlingen (DE)

(72) Inventors: Björn Haase, Stuttgart (DE); Thomas Alber, Stuttgart (DE); Günter Jahl, Gerlingen (DE)

(73) Assignee: ENDRESS+HAUSER CONDUCTA GMBH+CO. KG, Gerlingen (DE)

( * ) Notice: Subject to any disclaimer, the term of this patent is extended or adjusted under 35 U.S.C. 154(b) by 238 days.

(21) Appl. No.: 16/268,732

(22) Filed: Feb. 6, 2019

(65) Prior Publication Data
US 2019/0245861 A1 Aug. 8, 2019

(30) Foreign Application Priority Data
Feb. 6, 2018 (DE) ...................... 10 2018 102 608.0

(51) Int. Cl.
*H04L 9/08* (2006.01)
*H04L 29/06* (2006.01)
(Continued)

(52) U.S. Cl.
CPC ............ *H04L 63/102* (2013.01); *G06F 16/27* (2019.01); *H04L 9/0841* (2013.01);
(Continued)

(58) Field of Classification Search
CPC . H04L 63/102; H04L 63/108; H04L 63/0807; H04L 63/126; H04L 63/123;
(Continued)

(56) References Cited

U.S. PATENT DOCUMENTS 6,584,568 B1 * 6/2003 Dircks ................. G06F 21/604
380/28
7,505,772 B2 * 3/2009 Himmelstein .......... H04W 4/80
455/456.1
(Continued)

FOREIGN PATENT DOCUMENTS

WO 2014094981 A2 6/2014
WO 2016005121 A2 1/2016

OTHER PUBLICATIONS

Search Report for German Patent Application No. 10 2018 102 608.0, German Patent Office, dated Oct. 10, 2018, 9 pp.
(Continued)

*Primary Examiner* — Khoi V Le
(74) *Attorney, Agent, or Firm* — Christopher R. Powers; Endress+Hauser (USA) Holding Inc.

(57) ABSTRACT

The present disclosure relates to a method for user administration of a field device of process automation technology, comprising the steps of connecting a transport medium, such as a smartphone, to a user database, synchronizing user data from the user database with the transport medium, and connecting the transport medium to the field device. The method also includes transmitting the user data from the transport medium to the field device, checking of the user data by the field device, and granting access to the field device on the basis of verified valid user data.

18 Claims, 2 Drawing Sheets

(51) Int. Cl.
*G06F 16/27* (2019.01)
*H04L 9/32* (2006.01)
*H04W 12/00* (2021.01)
*H04W 12/06* (2021.01)
*H04W 12/08* (2021.01)
*H04W 84/18* (2009.01)

(52) U.S. Cl.
CPC .......... *H04L 9/0869* (2013.01); *H04L 9/3242* (2013.01); *H04L 9/3247* (2013.01); *H04L 63/0807* (2013.01); *H04L 63/108* (2013.01); *H04L 63/126* (2013.01); *H04W 12/009* (2019.01); *H04W 12/06* (2013.01); *H04W 12/08* (2013.01); *H04L 63/0435* (2013.01); *H04L 63/123* (2013.01); *H04W 84/18* (2013.01)

(58) Field of Classification Search
CPC ............... H04L 63/0435; H04L 63/083; H04L 63/0876; H04L 9/0869; H04L 9/0841; H04L 9/3247; H04L 9/3242; H04L 9/0643; H04L 9/3226; H04L 67/1095; H04W 12/009; H04W 12/06; H04W 12/08; H04W 84/18; G06F 16/27
See application file for complete search history.

(56) References Cited

U.S. PATENT DOCUMENTS

| | | | |
|---|---|---|---|
| 8,407,773 B1* | 3/2013 | Hayter | H04W 12/06 726/7 |
| 2002/0060246 A1 | 5/2002 | Gobburu et al. | |
| 2005/0203765 A1* | 9/2005 | Maritzen | G06Q 20/10 705/26.1 |
| 2014/0333412 A1* | 11/2014 | Lewis | H04W 12/06 340/5.2 |
| 2018/0101842 A1* | 4/2018 | Ventura | G06F 3/0619 |
| 2018/0316657 A1* | 11/2018 | Hardt | H04L 67/06 |

OTHER PUBLICATIONS

Kuegler, D. and Scheffer, Y., Password Authenticated Connection Establishment with the Internet Key Exchange Protocol version 2 (IKEv2), Internet Engineeering Task Force (IETF), ISSN: 2070-1721, Jun. 2012, 26 pp.

* cited by examiner

METHOD FOR USER ADMINISTRATION OF A FIELD DEVICE

CROSS-REFERENCE TO RELATED APPLICATION

The present application claims the priority benefit of German Patent Application No. 10 2018 102 608.0, filed on Feb. 6, 2018, the entire contents of which are incorporated herein by reference.

TECHNICAL FIELD

The present disclosure relates to a method for user administration of a field device.

BACKGROUND

From the IT field, directory services are common in corporate networks for central administration of users. These include LDAP, Active Directory, Domino, and others, for instance. Local user administration is also known in workstation PCs and mini PCs.

The resources, such as RAM, flash, and control options are usually very limited in low-power µC-based field devices, also referred to as embedded systems, so that usually no user administration is possible because of a lack of resources.

Although such devices are possibly networked with one another via a field bus, the latter may not be used for administrative tasks, so that such devices have at most a local user administration.

In other applications, network systems are separated physically or by what are known as firewalls for security reasons, so that no network connection to the corporate network segment can be established with the central directory services.

No such field devices are known which, without having an administrative online connection, nevertheless have central user administration. This applies in particular to two-wire devices. If, for example, an employee leaves the company or if a new user is to be set up, this is not easily possible or, respectively, the former employee retains access, which represents a security risk.

SUMMARY

The object of the present disclosure is to provide a centrally controllable user administration for field devices of process automation technology.

The object is achieved by a method comprising steps of connecting a transport medium, such as a smartphone, to a user database, synchronizing user data from the user database with the transport medium, and connecting the transport medium to the field device. The method also includes steps of transmitting the user data from the transport medium to the field device, checking the user data by the field device, and granting access to the field device on the basis of verified valid user data.

In one embodiment, the user data comprise one or more tickets, wherein a ticket is user-specific and field device-specific.

In one embodiment, a ticket is valid for a group of field devices. For instance, all devices of the same type, for example all pH sensors, may be enabled with one ticket. This depends on the type of distribution of the ticket. However, this depends in particular on the ticket's encryption type.

In one embodiment, the ticket is created exclusively by the user database.

In one embodiment, a public key of the field device and a public key of the user database are exchanged via the transport medium.

In one embodiment, the field device computes, using the public key of the user database and its own private key, a shared secret, in particular with a Diffie-Hellman key exchange. In addition, the user database computes from the public key of the field device and its own private key the same shared secret, in particular with a Diffie-Hellman key exchange.

In one embodiment, a secret shared by the user database and field device is exchanged via the transport medium.

In one embodiment, a ticket comprises one or more of the following characteristic data: user name, password, encrypted password, identification of the transport medium, serial number of the field device, rights, revision number, validity counter, validity from "validity counter," validity until "validity counter," validity period, valid from, valid until, and/or function code such as removal, add, or forceflag.

In one embodiment, at least all tickets related to the currently logged-on user at the transport medium and all tickets with the function code property "forceflag" are transmitted.

In one embodiment, the characteristic data in the ticket are encrypted with a first key derived from the shared secret, such as via one or more hash functions.

In one embodiment, the ticket in the field device can be decrypted using the shared secret.

In one embodiment, the ticket comprises a nonce that may precede the characteristic data. The nonce is what is known as a "number used once", i.e., a number or letter combination, such as a random number or a counter-generated number, which is used only once in the respective context.

In one embodiment, the ticket comprises a message authentication code, wherein the ticket may follow the characteristic data. The message authentication code is also referred to as a MAC. A message authentication code serves to achieve certainty about the origin of data or messages, and to check their integrity. The message authentication code algorithm requires two input parameters, e.g., the data to be protected, such as the payload data, and a secret key, such as a shared secret. From the two a checksum is computed, which may include the selfsame message authentication code.

In one embodiment, the message authentication code is computed with a second key derived from the shared secret.

In one embodiment, the ticket comprises a signature that may follow the characteristic data. The signature is generated with the private key of the user database and can be verified with the public key of the database.

In one embodiment, the user data comprise one or more tickets. The ticket may be user-specified and field device-specific. The ticket may be encrypted and authenticated using symmetric pairing keys that each field device shares with the central user database.

In one embodiment, the encrypted tickets may be exchanged via an unencrypted channel before the authentication is carried out.

In one embodiment, the encrypted tickets may contain payload data information for a key exchange or an authentication protocol a PAKE (i.e., password authenticated key exchange) protocol.

In one embodiment, the encrypted tickets may contain payload data information about a control device, such as, for example, if the control device is configured as the transport medium, and this information is used for a key exchange or an authentication protocol which incorporates keys stored on the control device.

In one embodiment, the encrypted tickets contain as payload data information about a smart card, and this information is used for a key exchange or an authentication protocol which incorporates keys stored on the smart card.

In one embodiment, the connection between transport medium and user administration is cryptographically protected.

In one embodiment, the connection between transport medium and field device is cryptographically protected.

BRIEF DESCRIPTION OF THE DRAWINGS

This will be explained in more detail with reference to the following figures.

DETAILED DESCRIPTION

In the figures, the same features are identified with the same reference symbols.

Figure 1:
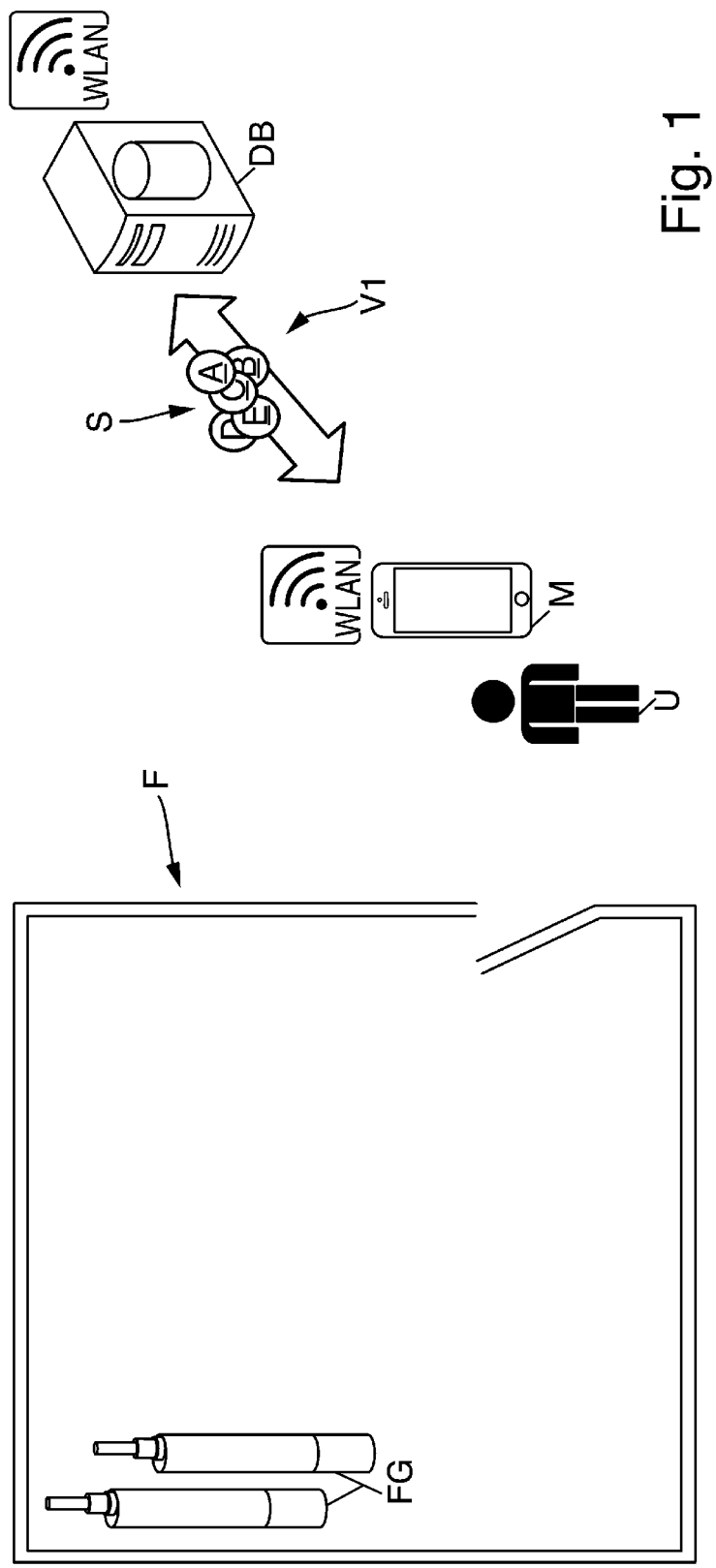
FIG. 1 shows the synchronization of user data from a user database with a transport medium.
Figure 2:
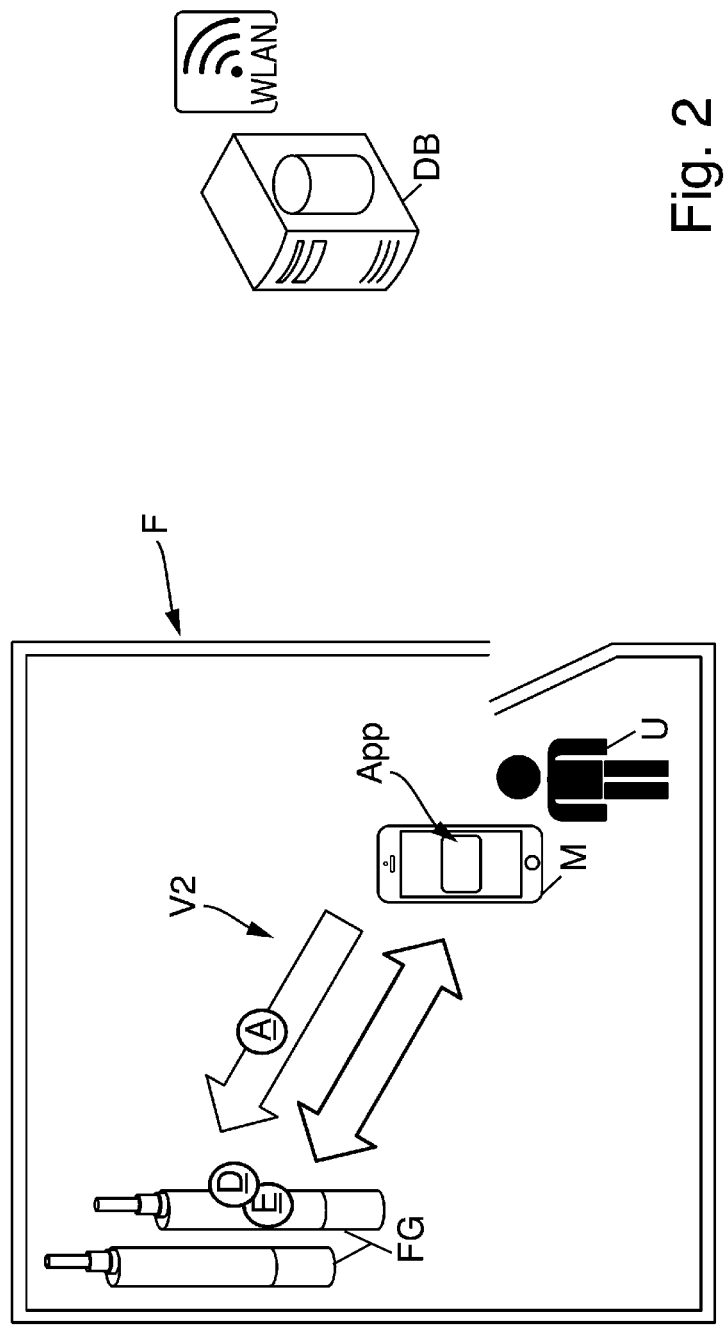
FIG. 2 shows the transmission of user data to a field device.

FIGS. 1 and 2 show the central steps of the method, which will be discussed below.

In principle, a central user administration DB is accomplished via a transport medium, e.g., via a smartphone M. A field device FG does not need to be connected online with the central user administration DB in order to do this. One or more field devices FG are located in a plant or factory F for this purpose.

A temporary connection V2, for example via Bluetooth between field device FG and smartphone M, ensures that all necessary information for user administration is transmitted in a tamper-proof and confidential manner.

There must occasionally be a connection V1 between the transport medium M and the central user administration DB in order to receive initial information or changes of a user database. This can be performed via a hard-wired connection, but also via WiFi.

For the user administration itself, standard mechanisms and tools are used.

An app G on the smartphone M, for example, can be used to login via Bluetooth. The field devices FG may also be configured in this manner.

The login and organization of user rights may be carried out via the app G on the field device FG, rather than on the smartphone M.

One or more encrypted tickets A, B, C, D, E provided with an authentication checksum (MAC or signature, see below) are distributed via the connection V2 between the field device FG and transport medium M. These tickets A, B, C, D, E may not be manipulated and may only be created by the central user administration DB.

Only the respective field device FG can decrypt the content of the tickets A, B, C, D, E.

The checksums in the ticket A, B, C, D, E ensure its authenticity. The ticket creator may be the central user administration DB.

The content of a ticket A, B, C, D, E includes, for example, the following features: user name; password; encrypted password; identification of the transport medium, in particular of the smartphone; device serial number; rights; revision counter; validity counter; validity from "validity counter;" validity until "validity counter;" access type; validity duration; valid from; valid until; date of ticket creation; and function code: "remove," "add," forceflag.

With the access type, different rights (authorizations) can result for each access, for instance by smartphone M or directly on site. This results in expert access for a user via Bluetooth, for example, and a read-only access for the on-site operation.

The date of the ticket creation serves as updated information and can also be used for field devices FG without a real-time clock in order to trigger an internal estimation of date/time. The latter is needed in order to be able to automatically erase expired tickets A, B, C, D, E or blocking information ("blacklists"). Blacklists can thus be used without the otherwise usual disadvantage that they grow continuously and avoids that they are never reduced in size. For this purpose, when a user U is blocked, the expiration date of the blocking ticket A, B, C, D, E is set at a somewhat later point in time than the last expiration date of all authorizations made for this user U.

In general, the "forceflag" is a prioritization of the ticket A, B, C, D, E. The background of this field is the control of the ticket transfer from the smartphone to the field device. Normally, it is sufficient to transfer the ticket A, B, C, D, E of the current user U to the field device FG (initially or as an update). However, for locking a user U on all field devices FG, a mechanism is needed to transmit the blocking information to all field devices FG and to do so independently of the current user U. This ticket field may be used for identifying such a demand (e.g., "broadcast," "urgent").

During the generation of the tickets A, B, C, D, E, a validity counter mechanism may be used, wherein the counter is incremented by the user database each time tickets A, B, C, D, E are generated. Since the transmission of the tickets A, B, C, D, E to a field device FG takes place asynchronously, an earlier generated "younger" ticket A, B, C, D, E could in some instances be imported at the field device FG only after a second, "older" ticket A, B, C, D, E. This may lead to an issue, for example, if a user U who had been added to the system in the "older" ticket has been removed from a more recent ticket A, B, C, D, E. Via the counter mechanism and a validity check, it may then be ensured that the older ticket A, B, C, D, E for adding the user U will no longer be successfully accepted by the field device FG after the ticket A, B, C, D, E to remove the user U is imported.

In one embodiment, in addition to the encrypted data field, the ticket A, B, C, D, E also contains what are known as associated data (AD) which are not encrypted although they are encompassed by the authentication checksum (MAC or signature). For example, the "forceflag" may be transmitted as part of such an associated data field. In a protocol with a plurality of tickets A, B, C, D, E, the sequence of a decryption of the tickets A, B, C, D, E can thus be prioritized before a decryption takes place. An identification of the associated field device FG is advantageously also stored unencrypted in the AD field of the ticket A, B, C, D, E, effectively as a "destination address" which specifies the field device FG for which this ticket A, B, C, D, E is intended.

The field device FG first checks the authenticity of a transmitted ticket A, B, C, D, E and decrypts it.

Only if the corresponding, successfully checked ticket A, B, C, D, E is present at the field device FG can an authentication protocol (login protocol) be carried out with the control unit, e.g., the transport medium M, and the user U with the information contained therein. On successful completion of the protocol, the associated user U is granted access and the corresponding rights.

The tickets A, B, C, D, E are used in the field device FG. The tickets A, B, C, D, E have, for example, a fixed lifespan. The tickets A, B, C, D, E may perform functions (e. g., delete other tickets A, B, C, D, E). The ticket A, B, C, D, E of the current user U is always transmitted. The tickets A, B, C, D, E which have set the forceflag in order to be able to perform functions in the field device FG are also transmitted. For this purpose, the forceflag is stored, for example, in the unencrypted portion of the ticket A, B, C, D, E, e.g., the associated data.

The central user administration DB is configured with standard mechanisms and users U are created with their rights (authorization).

For the transmission of tickets A, B, C, D, E to field devices FG, a synchronization S of the smartphone M with the central user administration DB must take place. For this purpose, the user U first authenticates himself to the user database, for example by entering a password on a control device (usually similar to the transport medium M). The user database then creates updated tickets A, B, C, D, E for all field devices FG and transmits them to the transport medium M. Each user U has a ticket A, B, C, D, E for each possible device FG. The number of tickets A, B, C, D, E thus results as follows: users×devices.

As soon a user U wants to connect to a field device FG, the user-specific and device-specific ticket A, B, C, D, E is transmitted to the field device FG. As a result, the field device FG now knows this one user U and the user's access rights. The payload data stored in the ticket A, B, C, D, E remain (usually decrypted) in the field device memory. The user database in the field device FG is thus continuously expanded with each new user U who logs in. Database entries based on expired tickets A, B, C, D, E are advantageously gradually removed in the field device FG.

With the continuous development of the user database in the field device FG, it becomes possible for users U to log in with the smartphone M even if no tickets A, B, C, D, E from the central user manager DB are present in the smartphone M, as long as the information in the field devices database is still valid (e.g., the connection establishment took place prior to the expiration period specified in the ticket).

If rights should be withdrawn from a user U, this is done via notation in the central user administration DB. For this purpose, all corresponding user tickets A, B, C, D, E are marked "remove" and the forceflag is set. If a synchronization of a smartphone M with the central user administration DB then takes place, and the smartphone M later accesses field devices FG, this withdrawal of rights is directly implemented because of the forceflag, regardless of which user U is logged in at the time. Thus, a user U cannot counteract the rights withdrawal by withdrawing from the synchronization with the central user administration DB. All "active" smartphones M assist in deleting the rights of this one user U on all field devices FG.

It is likewise possible to define tickets A, B, C, D, E with which, for example, cryptographic keys that are relevant for the entire system are to be transmitted to the field devices FG, such as for a protected protocol for error status transmission or for transmitting measured values in a machine-machine interface. Tickets A, B, C, D, E such as these are also prioritized via the forceflag.

The method is summarized again as follows: first, keys are exchanged between the field device FG and the user database via the transport medium M, on the basis of which a shared secret between user database and field device FG can be generated. The public keys of the user database and field device FG are advantageously exchanged. The user database then has, for example, a list with all public keys of the field devices FG and/or control units in the system. The user database thus knows which field devices FG belong to it; the field device FG knows which user database it belongs to. Where applicable, characteristic data of the field devices A, B, C, D, E, such as serial number or production date, or of the user database, such as name, are additionally exchanged.

In the next step, a shared secret is computed by the field device FG and in the user database. If the Diffie-Hellman key exchange is used for the computation, the same secret, namely the "shared secret", is obtained with the respective external public key and the own private key.

By medium of this shared secret, a key is computed, for example via single or multiple hash functions, via which the payload data in the user database is encrypted. The encryption can be performed using a number used only once (i.e., a nonce). Furthermore, a message authentication code may be added that is computed from a key which is derived from the shared secret. The field device FG can check the origin and integrity of the ticket A, B, C, D, E via the message authentication code (MAC). As an alternative to the message authentication code, a signature may also be used. In the event of the ticket checking, the public key of the database may be used.

The field device FG can decrypt the encrypted ticket A, B, C, D, E via the shared secret.

Because the ticket A, B, C, D, E itself is encrypted and authenticated, the transport itself may take place unencrypted and unauthenticated.

By medium of the ticket A, B, C, D, E, corresponding rights can be granted to or withdrawn from a user U.

As mentioned, the tickets A, B, C, D, E are encrypted (confidentiality) and authenticated (corresponds to a kind of signature).

For both cryptographic tasks, either direct public/private key systems (asymmetric) or symmetric encryption methods can be used in any combination. In the case of authentication methods, the term "signature" (asymmetric) and "Message Authentication Code" (MAC, symmetric) are used.

The combination of public key exchange with computation of a shared secret, via Diffie-Hellman key exchange and computation of a message authentication code using the shared secret, is advantageous since it is adequately secure, e.g., shared secret is only used by exactly one field device A, B, C, D, E, and also efficient. The "expensive" asymmetric Diffie-Hellman DH operation only needs to be performed once, whereas the expensive asymmetric signature check must be performed anew for each ticket when a signature is used for authentication.

The invention claimed is:

1. A method for user administration of a field device of process automation technology, comprising steps of:
   mirroring a user database with a server;

connecting a transport device to the user database of the field device;

synchronizing user data from the user database of the field device with the transport device, wherein the user data comprises at least one ticket including one or more of the following characteristic data: user name, password, encrypted password, identification of the transport medium, serial number of the field device, rights, revision counter, validity counter, validity from validity counter, validity until validity counter, access type, validity duration, valid from, valid to, date of the ticket creation, and a function code, and wherein the function code includes one of remove, add, and forceflag;

connecting the transport device to the field device;

transmitting the user data from the transport device to the field device;

checking an authenticity of the transmitted user data by the field device, wherein the authenticity of the transmitted user data determines whether the at least one ticket is valid;

granting access to the field device on the basis of verified valid user data;

storing and updating the user data on the user database of the field device for users having access to the field device.

2. The method of claim 1, wherein the user data comprise at least one ticket, and wherein the at least one ticket is user-specific and field device-specific.

3. The method of claim 2, wherein the at least one ticket is created exclusively by the user database.

4. The method of claim 2, wherein a public key of the field device and a public key of the user database are exchanged via the transport device.

5. The method of claim 4, wherein the field device computes a shared secret from the public key of the user database and a private key; and wherein the user database computes the shared secret from the public key of the field device and a private key of the user database.

6. The method of claim 5, wherein the shared secret is exchanged via the transport device.

7. The method of claim 1, wherein the at least one ticket corresponding to a currently logged-on user at the transport device and including the function code of forceflag is transmitted.

8. The method of claim 1, wherein the characteristic data is encrypted with a first key derived from the shared secret.

9. The method of claim 8, wherein the at least one ticket in the field device is encrypted based on the shared secret.

10. The method of claim 9, wherein the at least one ticket includes a nonce.

11. The method of claim 10, wherein the at least one ticket includes a message authentication code.

12. The method of claim 11, wherein the message authentication code is computed and verified with a second key derived from the shared secret.

13. The method of claim 12, wherein the at least one ticket includes a signature generated from the private key of the user database and verified from the public key of the user database.

14. The method of claim 13, wherein the at least one ticket is encrypted and authenticated using symmetric keys that each field device shares with the central user database.

15. The method of claim 14, wherein the at least one ticket is exchanged via an unencrypted channel before the authentication is carried out.

16. The method of claim 15, wherein the at least one ticket includes payload data information for a key exchange or an authentication protocol.

17. The method of claim 15, wherein the at least one ticket contains payload data information about a smart card, and wherein the payload data information is sued for a key exchange to an authentication protocol which incorporates keys stored on the smart card.

18. The method of claim 17, wherein the at least one encrypted ticket includes payload information data about a control device, and wherein the payload data information is used for a key exchange or an authentication protocol which incorporates keys stored on the control device.

\* \* \* \* \*